United States Patent
Rosi et al.

(10) Patent No.: US 6,761,663 B2
(45) Date of Patent: Jul. 13, 2004

(54) METHOD AND DEVICE FOR CONTROLLING SHIFTING ELEMENTS

(75) Inventors: Hansjörg Rosi, Meckenbeuren (DE); Christian Popp, Kressbronn (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/001,705

(22) Filed: Nov. 1, 2001

(65) Prior Publication Data

US 2002/0055812 A1 May 9, 2002

(30) Foreign Application Priority Data

Nov. 3, 2000 (DE) .......................................... 100 54 624

(51) Int. Cl.[7] .................. B60K 41/04; G06F 17/00; G06F 19/00; G06F 7/00
(52) U.S. Cl. ........................................... 477/34; 701/58
(58) Field of Search ................................. 477/155, 156, 477/164, 34; 701/56, 58, 61, 57, 64, 66; 74/335

(56) References Cited

U.S. PATENT DOCUMENTS

| | | | | |
|---|---|---|---|---|
| 4,414,946 A | * | 11/1983 | Daumer et al. | 123/406.62 |
| 5,812,957 A | * | 9/1998 | Iizuka | 701/58 |
| 6,240,340 B1 | * | 5/2001 | Minowa et al. | 701/1 |
| 6,259,984 B1 | * | 7/2001 | Kanzaki et al. | 701/51 |
| 6,580,993 B2 | * | 6/2003 | Rosi et al. | 701/56 |

FOREIGN PATENT DOCUMENTS

| | | | |
|---|---|---|---|
| DE | 694 03 196 T2 | 9/1997 | F16H/61/02 |
| DE | 694 25 201 T2 | 12/2000 | F16H/61/02 |

* cited by examiner

Primary Examiner—Tisha D Lewis
(74) Attorney, Agent, or Firm—Davis & Bujold, PLLC

(57) ABSTRACT

A method for control of operation of shifting elements for an automatic transmission. Each cycle of the control for similar controls are configured to shift in an overlapping manner during operation of the automatic transmission.

4 Claims, 1 Drawing Sheet

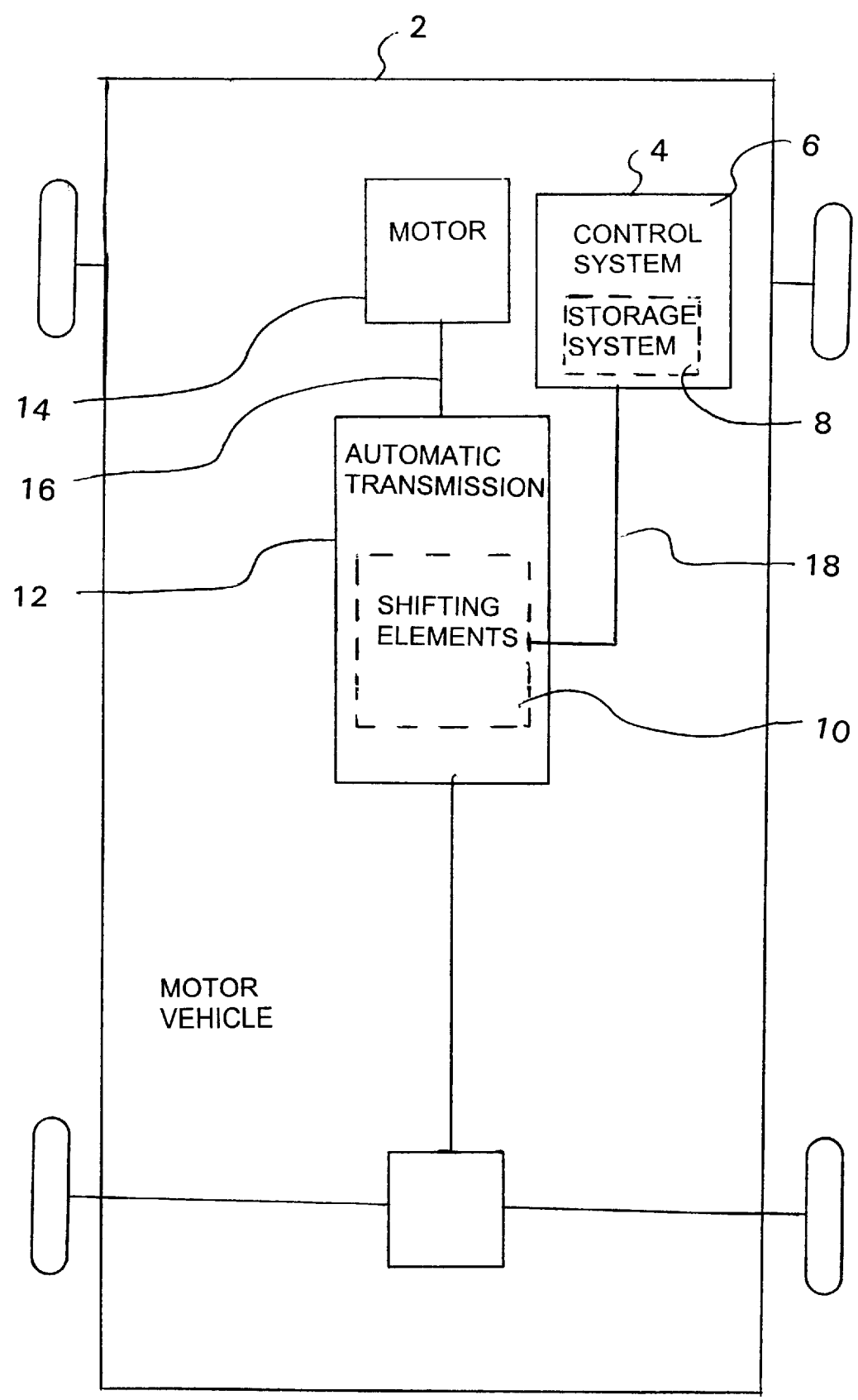

METHOD AND DEVICE FOR CONTROLLING SHIFTING ELEMENTS

FIELD OF THE INVENTION

The invention concerns a method for controlling shifting elements of automatic transmissions and a device for applying the method.

BACKGROUND OF THE INVENTION

Increasing demands are always being made today on automatic transmissions with regard to shifting quality, spontaneity and the number of gears to be shifted, which correspond to high functionality and control requirements. Besides, a consequence of the increased economic requirements is an increase in the complexity of the software used. This, in turn, results in the increasing need for storage and application expenditure and an undesirable increase in operating hours of the applications.

To carry out gear shifts and gear-introducing operations, the respective shifting elements have to be controlled accordingly. To this superimposed adjustments and adaptations are added which optimize the criteria to be observed by the controlled function with regard to the requirements. Therefrom, a multiplicity of separate functions results which ensure the functionality, especially for the individual control data of the respective kinds of shift, but cause many special cycles and special functions.

A constant narrowing of hardware such as storing media and computer operating hours thus results, the same as of personnel capacity for maintenance, operation extensions, applications and operation checkout.

SUMMARY OF THE INVENTION

Therefore, the problem on which this invention is based is to outline a method for controlling shifting elements of an automatic transmission which, while retaining the same shifting quality, makes a reduction in increasing requirements possible.

In addition, a device is outlined for applying the method.

This problem is solved by the method and the device according to the invention described in further detail below.

Accordingly, it is proposed to configure the cycles for control of similar controls overlapping in shifting kinds. This is especially possible since many control cycles and the application parameters thereof, such as a pressure sequence during filling of the shifting elements, are in essence identical.

According to the invention, identical or similar cycles are stored once with homogeneous application parameters in the control.

This procedure has the advantage of reducing the requirements of the hardware and employment of personnel.

Besides, the use of the inventive method results in a lowering of production cost and of development time.

The inventive coordination of cycles is explained below in detail in the example of the control of gear shifts (upshifts and downshifts) and the kinds of gear introduction (reverse/forward).

BRIEF DESCRIPTION OF THE DRAWING

The invention will now be described, by way of example, with reference to the accompanying drawing, in which:

FIG. 1 is a diagrammatic representation of a motor vehicle incorporating a device having a storage system and a control system for controlling shifting elements of an automatic transmission.

DETAILED DESCRIPTION OF THE INVENTION

As can be seen in FIG. 1, the basic components for use with the present in invention are generally shown. A motor vehicle 2 incorporates a device 4 having a control system 6 and a storage system 8 for controlling shifting elements 10 of an automatic transmission 12. A motor 14 supplies driving power, via a shaft 16, to the automatic transmission 12 and an electrical coupling 18 interconnects the device 4 with the shifting elements 10 of the automatic transmission 12. As such features are conventional and well known in this art, a further detail discussion concerning the same is not provided.

Here the identical cycles for the control of the clutches as for the gear shifts are used for gear introduction. Since both during gear shifts and during gear introduction one or more clutches effect the engagement, that is, the introduction of the adequate gear and the load take over, this is carried out, according to the invention, with identical control of the clutches by utilization of the same adjustments and adaptations.

The method here presented allows an improved use of synergy possible due to the identical functionality in the control of the same shifting elements.

Necessary changes and extensions of the functionality are to be carried out only once and do not have to be changed, applied and tested during several cycles.

This accelerates and simplifies the carrying out of extensions and the testing procedure so that a quick utilization of the functions is made possible.

As one other advantage of the invention, an improved clearness of the functionality is obtained. This likewise works out upon the improved testing capacity and on a quick integration of the functionalities.

To apply the method presented here, a device is needed which has a storage system and a control system so that the cycles stored in the storage system overlapping in shifting kind can be activated, as needed, by the control system. In this manner, the cycles overlapping in shifting manner are efficiently called up.

What is claimed is:

1. A method for control of an automatic transmission, the method comprising the steps of:

preforming a gear introduction step and a gear shift step according to a plurality of control cycles for operation of the automatic transmission;

actuating a plurality of shifting elements of the automatic transmission according to an assigned control cycle of the plurality of control cycles;

sharing assigned control cycles for both a gear introduction step and a gear shift step which overlap in shifting kind; and storing a single copy of each shared control cycle in a storage system of the automatic transmission.

2. A method for control of shifting elements of an automatic transmission, the method comprising the steps of:

providing a plurality of shifting elements in the automatic transmission;

actuating the shifting elements according to at least one of a plurality of desired control cycles for both a gear shift introduction and a gear shift;

assigning a desired control cycle for each one of the shifting elements, with each desired control cycle being selected from a set of shared control cycles;

executing a same desired control cycle for control of similar gear shift introductions and gear shifts; and storing a single copy of each shared control cycle in a storage system of the automatic transmission.

3. The method according to claim 2, further comprising the step of providing common parameters among the single copy of each shared control cycles.

4. A method for control of shifting elements of an automatic transmission, the method comprising the steps of:

providing a plurality of shifting elements in the automatic transmission;

for each gear introduction and each gear shift, controlling actuation of the shifting elements according to at least one of a plurality of desired control cycles;

assigning a desired control cycle for each one of the shifting elements, with each desired control cycle being selected from a group of shared control cycles;

sharing a same desired control cycle for control of each similar gear introduction and each similar gear shift; and storing a single copy of each shared control cycle in a storage system of the automatic transmission.

* * * * *